(12) United States Patent
Hartmann et al.

(10) Patent No.: US 9,061,233 B2
(45) Date of Patent: *Jun. 23, 2015

(54) CORRUGATED FLUID TREATMENT PACKS AND METHODS OF MAKING THEM

(75) Inventors: Thomas Hartmann, Huntington Station, NY (US); Stephen Geibel, Cortland, NY (US)

(73) Assignee: Pall Corporation, Port Washington, NY (US)

( * ) Notice: Subject to any disclaimer, the term of this patent is extended or adjusted under 35 U.S.C. 154(b) by 281 days.

This patent is subject to a terminal disclaimer.

(21) Appl. No.: 13/555,655

(22) Filed: Jul. 23, 2012

(65) Prior Publication Data
US 2013/0014883 A1    Jan. 17, 2013

Related U.S. Application Data

(62) Division of application No. 11/817,589, filed as application No. PCT/US2006/007469 on Mar. 3, 2006, now Pat. No. 8,236,210.

(60) Provisional application No. 60/658,163, filed on Mar. 4, 2005.

(51) Int. Cl.
*B29C 41/08* (2006.01)
*B01D 46/52* (2006.01)
*B01D 29/11* (2006.01)
*B01D 46/00* (2006.01)

(52) U.S. Cl.
CPC ............ *B01D 46/521* (2013.01); *B01D 29/111* (2013.01); *B01D 46/0001* (2013.01); *B01D 46/528* (2013.01)

(58) Field of Classification Search
USPC .................................... 264/6, 8, 12, 13, 113
See application file for complete search history.

(56) References Cited

U.S. PATENT DOCUMENTS

| | | | | |
|---|---|---|---|---|
| 2,186,440 A | * | 1/1940 | Williams | 210/493.1 |
| 4,936,991 A | * | 6/1990 | Peyton et al. | 210/356 |
| 5,409,642 A | * | 4/1995 | Allen et al. | 264/6 |

* cited by examiner

*Primary Examiner* — Larry Thrower
*Assistant Examiner* — Xue Liu
(74) *Attorney, Agent, or Firm* — Leydig, Voit & Mayer

(57) ABSTRACT

Corrugated fluid treatment packs and methods of making corrugated fluid treatment packs are disclosed. The fluid treatment packs may comprise a non-woven fibrous structure having a tubular configuration, a longitudinal axis, and circumferentially extending corrugations.

20 Claims, 7 Drawing Sheets

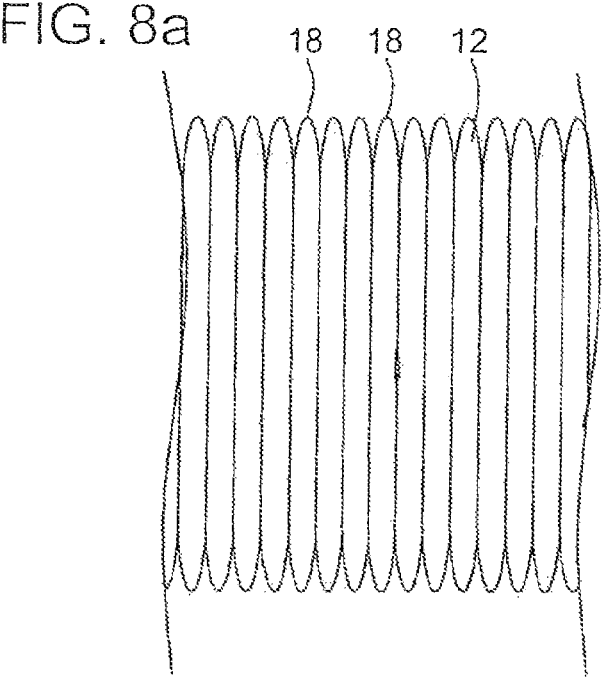
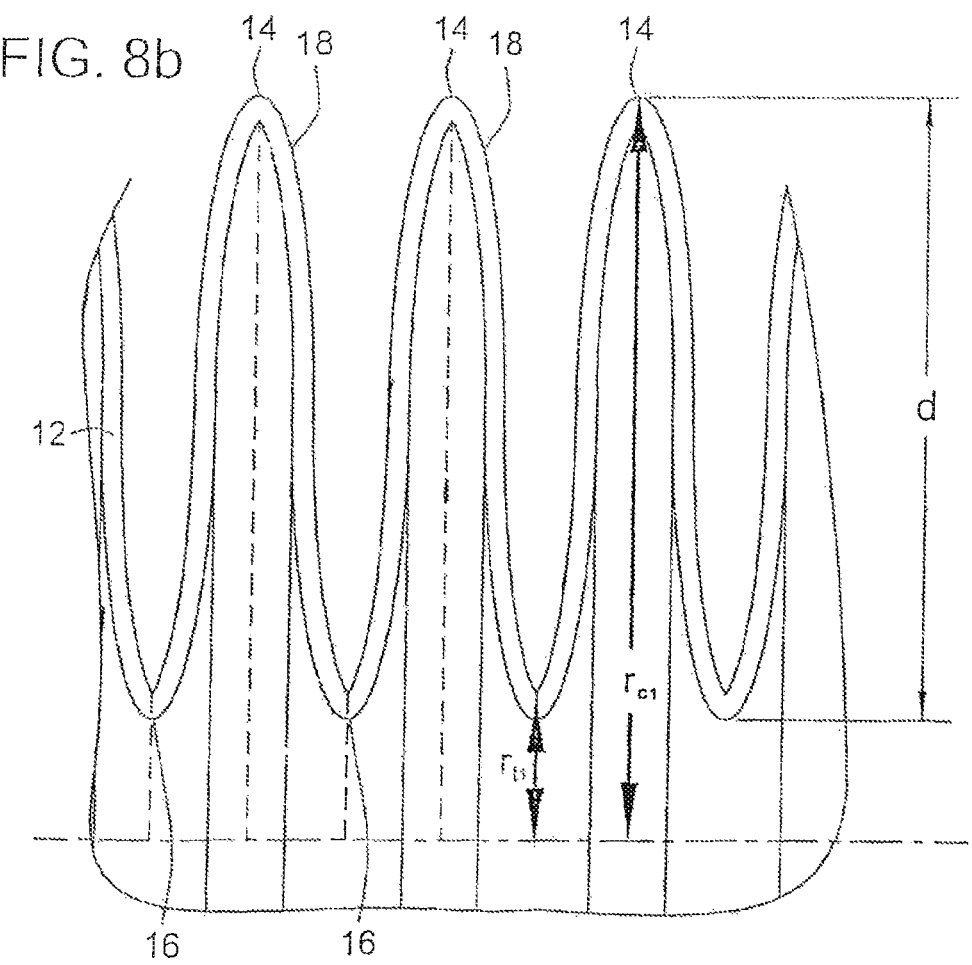

US 9,061,233 B2

CORRUGATED FLUID TREATMENT PACKS AND METHODS OF MAKING THEM

DISCLOSURE OF THE INVENTION

The present invention relates to methods of making fluid treatment packs that may be used to purify, separate, and/or concentrate a variety of fluids and/or fluid components. The fluids may include liquids, gases, and mixtures and other combinations of liquids, gases, and/or solids.

In accordance with one aspect of the invention, methods of making a fluid treatment pack may comprise depositing fibers to form a non-woven fibrous structure on a shaped mandrel. The shaped mandrel has a longitudinal axis and a plurality of circumferentially extending corrugations, each corrugation having first and second circumferentially extending sloped regions. Depositing the fibers includes forming first and second circumferentially extending non-woven webs on the first and second sloped regions of each corrugation and extending the first and second webs into one another along one of a circumferentially extending crest and a circumferentially extending trough of the fibrous structure and into adjacent webs on adjacent corrugations at the other of the crest and trough of the fibrous structure to form a porous, tubular, circumferentially-corrugated fibrous structure. Depositing the fibers further includes relatively rotating the shaped mandrel and one or more dies arranged to direct fibers onto the first and second sloped regions of the corrugations of the shaped mandrel to form the first and second webs extending into one another along the crests and troughs.

Fluid treatment packs and elements and methods of making fluid treatment packs and elements in accordance with one or more aspects of the present invention have many advantages. For example, the fluid treatment packs and elements provide a large surface area available for fluid treatment per unit length of fluid treatment pack and minimize potential leakage paths within the pack. Additionally, fluid treatment packs and elements having any desired length, corrugations of any desired depth, and a wide variety of treatment characteristics may be produced by methods that are simple and reliable.

BRIEF DESCRIPTION OF THE DRAWINGS

FIG. 8a is a side view of a portion of another fluid treatment pack.

FIG. 8b is a partial section view of a portion of the fluid treatment pack of FIG. 8a.

FIG. 9b is a partial section view of a portion of the fluid treatment pack of FIG. 9a.

DESCRIPTION OF EMBODIMENTS

Fluid treatment packs may be structured in many different ways. Some fluid treatment packs may include a generally tubular, corrugated porous structure comprising a fluid treatment region such as a separation or filter medium, a capture medium, or a coalescer medium. The porous structure may further comprise a longitudinal axis and one or more corrugations including one or more crests and one or more troughs. Each corrugation may comprise first and second porous regions extending into one another, e.g., merging continuously into one another, at a crest and/or a trough. The crest(s), trough(s), and corrugation(s), including the first and second porous regions, may extend helically or circumferentially relative to the longitudinal axis of the porous structure. Fluid to be treated by the fluid treatment pack may be directed outside-in or inside-out through the porous structure and the fluid treatment region, and fluid flowing through the porous structure and the fluid treatment region may be treated in any of a wide variety of ways. For example, the fluid treatment region may be arranged to remove particles from the fluid, to coalesce and/or separate one fluid phase from another fluid phase, or to physically and/or chemically bind one or more substances in the fluid.

Figure 1:
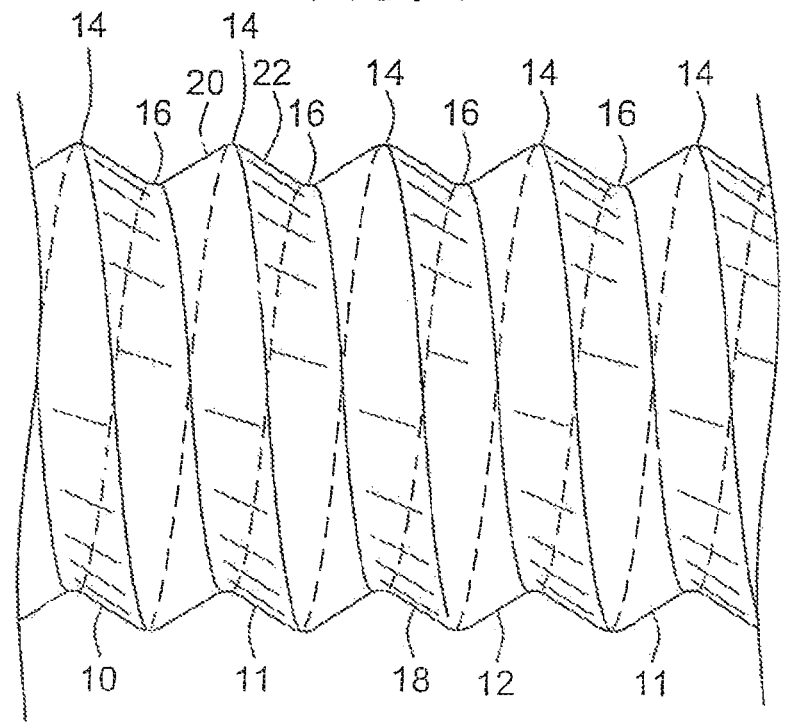
FIG. 1 is a side view of a portion of a fluid treatment pack with a helical corrugation.

One example of a fluid treatment pack 10 is shown in FIG. 1. The fluid treatment pack 10 may include a generally tubular, corrugated fibrous, e.g., non-woven, structure 12 having a longitudinal axis, a fluid treatment region 11, a helically extending crest 14, and a helically extending trough 16. The corrugated fibrous structure 12 may define only one helically extending corrugation 18 comprising first and second adjacent webs 20, 22 extending helically along the axis of the fibrous structure 12 and extending into one another along the crest 14 and along the trough 16.

Figure 2:
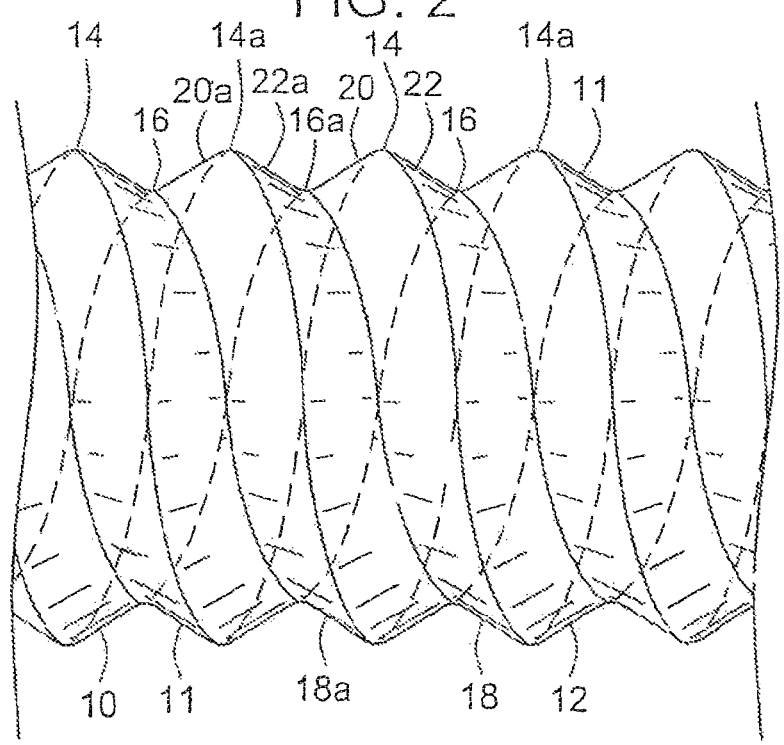
FIG. 2 is a side view of a portion of a fluid treatment pack with multiple helical corrugations.
Figure 3:
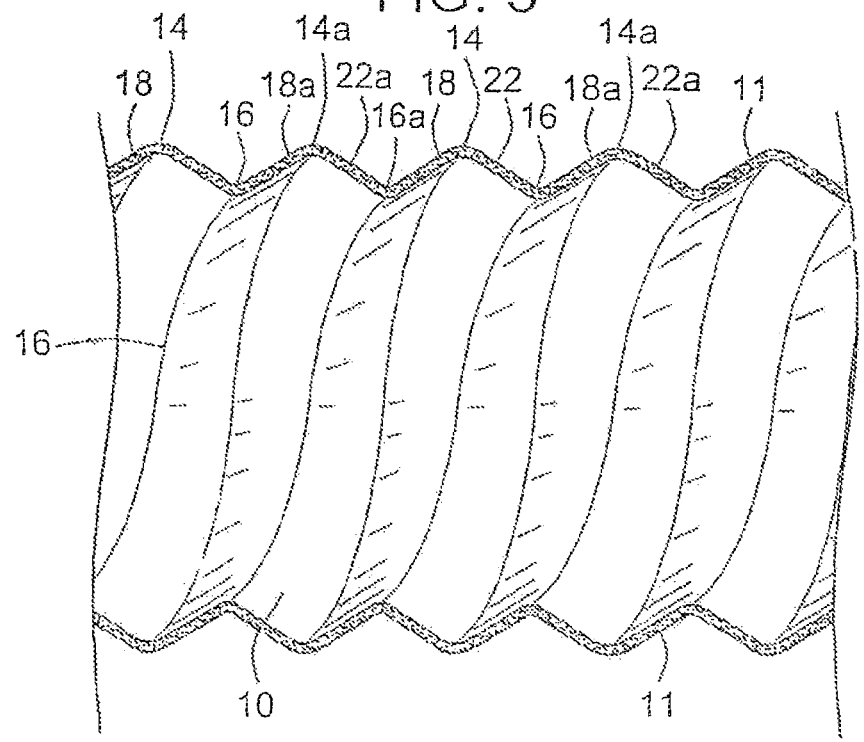
FIG. 3 is section view of a portion of the fluid treatment pack of FIG. 2.

An example of another fluid treatment pack 10 is shown in FIGS. 2 and 3. The fluid treatment pack 10 may include a corrugated fibrous structure 12 having a fluid treatment region 11, first and second helically extending adjacent corrugations 18, 18a, first and second helically extending crests 14, 14a, and first and second helically extending roughs 16, 16a. The first helically extending corrugation 18 may include first and second adjacent webs 20, 22 extending along the axis of the fibrous structure 12 and extending into one another along the first crest 14. The second helically extending corrugation 18a may include first and second adjacent webs 20a, 22a, extending along the axis of the fibrous structure 12 and extending into one another along the second crest 14a. The webs 20, 22 of the first helically extending corrugation 18 may extend into the adjacent webs 20a, 22a of the second helically extending corrugation 18a along the troughs 16, 16a. Other multiple helix embodiments may include more than two helically extending corrugations. For example, the fluid treatment pack may include a third or a fourth helically extending corrugation.

Figure 4:
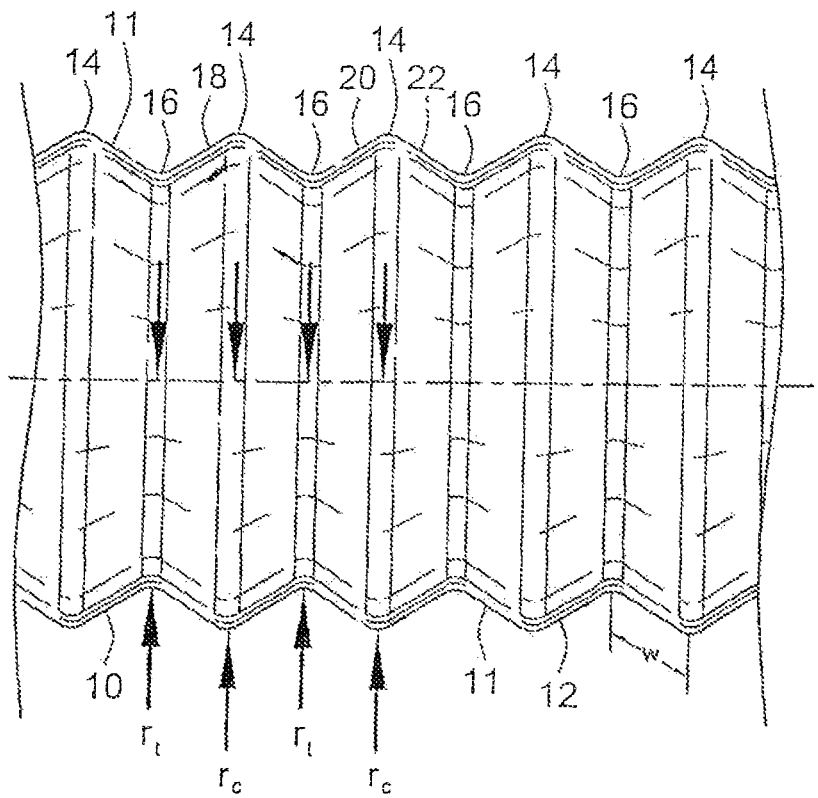
FIG. 4 is a side view of a portion of a fluid treatment pack with circumferential corrugations.

Another example of a fluid treatment pack 10 is shown in FIG. 4. The fluid treatment pack 10 illustrated in FIG. 4 may include a generally tubular corrugated fibrous structure 12 having a longitudinal axis, a fluid treatment region 11, a plurality of circumferentially extending crests 14, a plurality of circumferentially extending troughs 16, and a plurality of circumferentially extending corrugations 18. In embodiments including circumferentially extending corrugations, each corrugation 18 may comprise first and second adjacent webs 20, 22 which extend circumferentially around the axis of the fibrous structure 12 and extend into one another along a circumferentially extending crest 14 or trough 16. In the embodiment illustrated in FIG. 4, the first and second adjacent webs 20, 22 of one corrugation may extend into one another along a crest 14 and may extend into adjacent webs of adjacent corrugations 18 along a trough 16. Alternatively, the first and second adjacent webs 20, 22 may extend into one another along a trough 16 and into adjacent webs of adjacent corrugations 18 along a crest 14.

Figure 5:
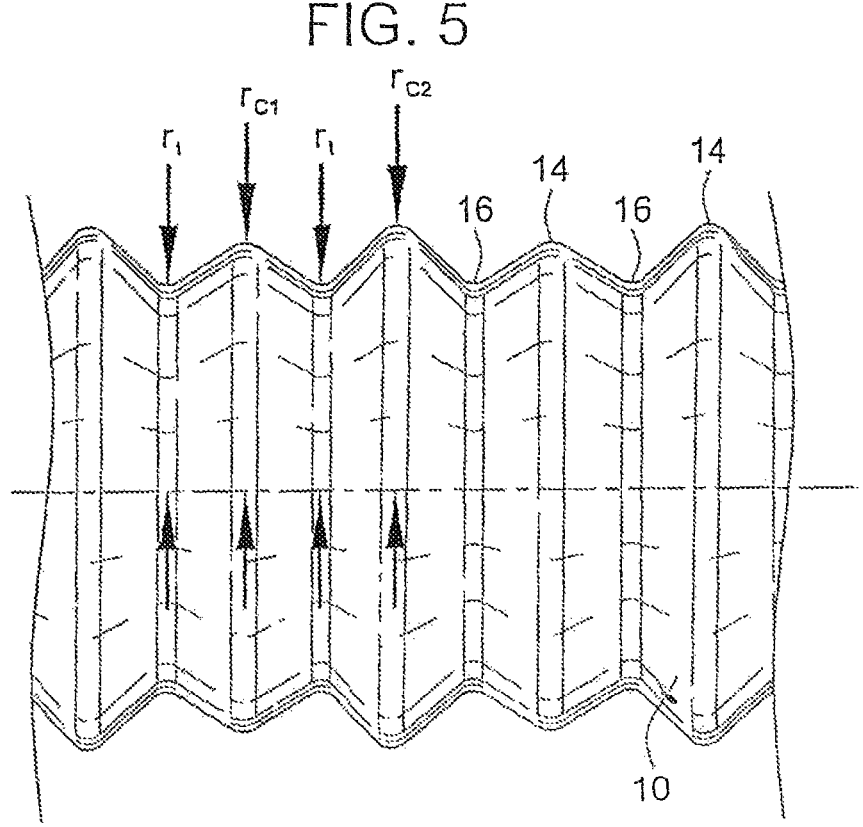
FIG. 5 is a side view of a portion of another fluid treatment pack with circumferential corrugations.

For both the helical and circumferential embodiments, the corrugations 18 including crests 14 and troughs 16 may be variously configured. The crests 14 and troughs 16 may be positioned at any suitable radial distance from the longitudinal axis of the fluid treatment pack. For example, the crests 14 may have a radial distance ($r_c$) of from about ¼ inch or less to about 12 inches or more from the longitudinal axis of the fibrous structure 12. The troughs 16 may have a radial distance ($r_t$) of from about ⅛ inch or less to about 8 inches or more from the longitudinal axis of the fibrous structure 12. In the embodiments shown, for example, in FIGS. 1-4, all of the crests 14 have the same radial distances $r_c$ from the longitudinal axis, and all of the troughs 16 have the same radial distance $r_t$ from the longitudinal axis. However, in some embodiments, some crests may have a radial distance from the longitudinal axis that is different from the radial distance from the longitudinal axis of other crests. Similarly, some troughs may have a radial distance from the longitudinal axis that is different from the radial distance from the longitudinal axis of other troughs. For example, in the circumferential embodiment illustrated in FIG. 5, adjacent crests 14 have different radial distances from the longitudinal axis ($r_{c1}$, $r_{c2}$). While FIG. 5 illustrates a fibrous structure including crests 14 having two different distances in an alternating configuration, the invention is not so limited. For both the helical and circumferential embodiments, any of the crests may have a radial distance from the longitudinal axis equal to or different from the radial distance of any other crest. Similarly, any of the troughs may have a radial distance from the longitudinal axis equal to or different from the radial distance of any other trough. Further, the radial distance from the longitudinal axis may be constant along a single crest and/or trough, as shown in the Figures, or may vary along a single crest and/or trough.

Figure 6:
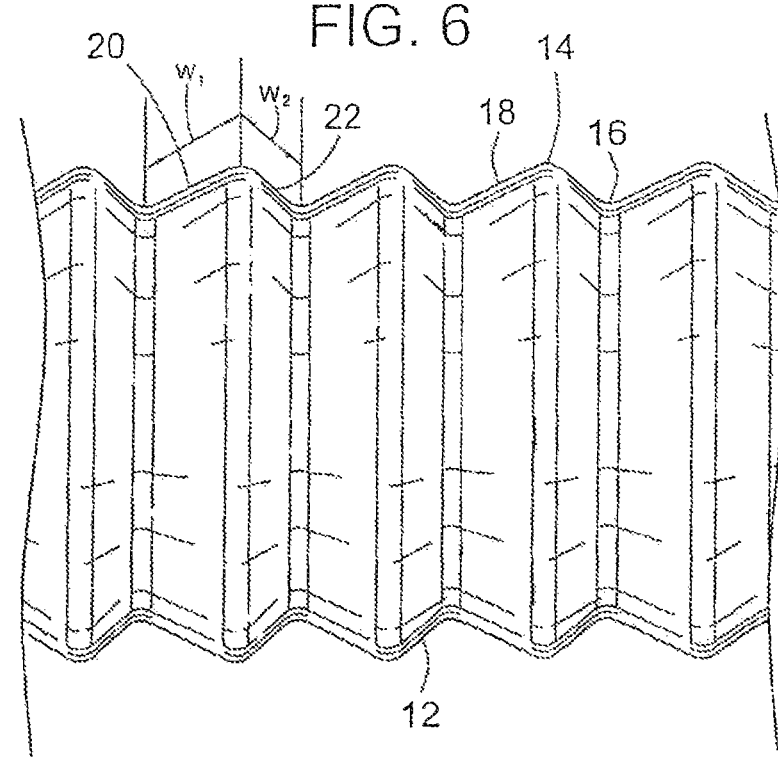
FIG. 6 is a side view of a portion of another fluid treatment pack with circumferential corrugations.
Figure 7:
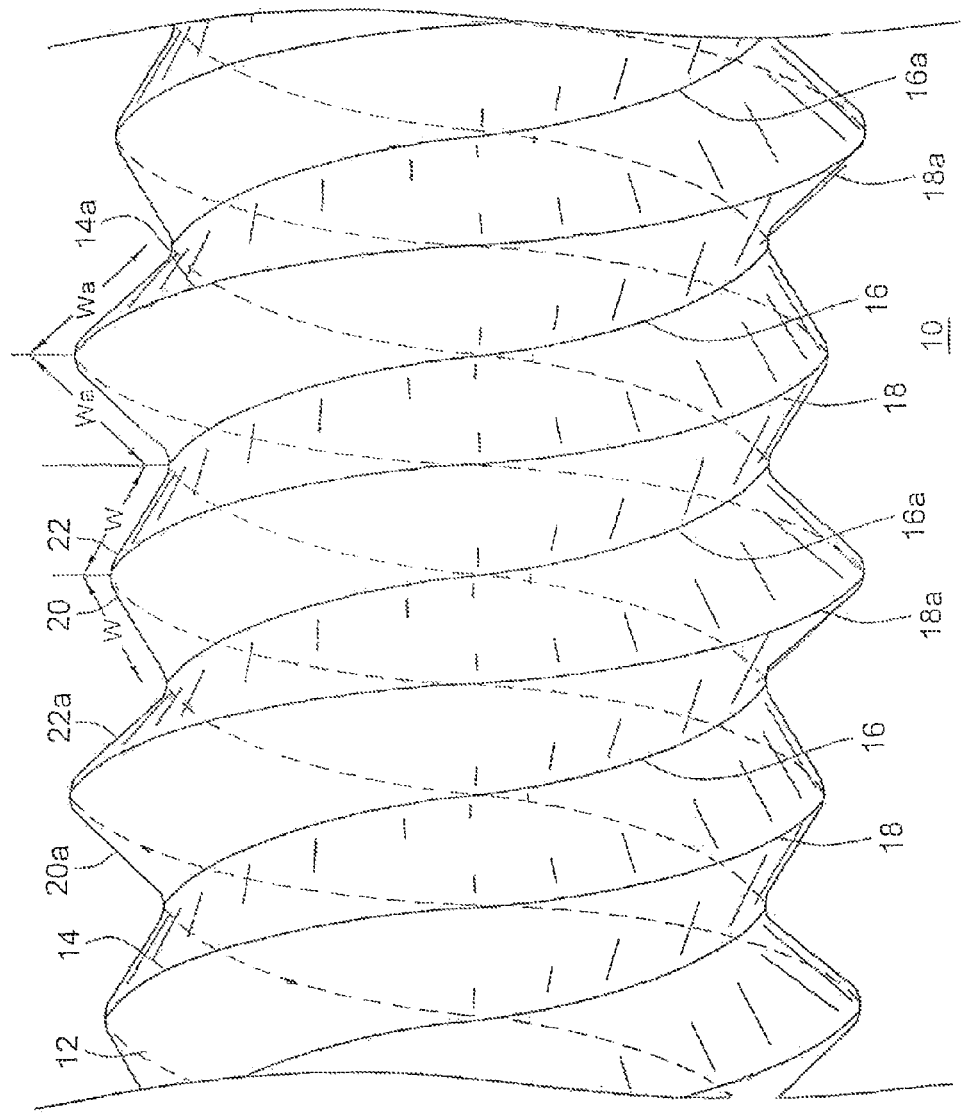
FIG. 7 is a side view of a portion of another fluid treatment pack with helical corrugations.

The first and second webs 20, 22 which comprise the corrugations 18 may have any suitable width (w), i.e., the distance along the surface of the web between an adjacent crest 14 and trough 16. For example, the webs 20, 22 may have a width in the range of from about 0.1 inches or less to about 5 inches or more. The first and second webs 20, 22 may have the same or different widths. For example, in the embodiments illustrated in FIGS. 1 and 2, the first and second webs 20, 22 may have substantially equal widths. In an embodiment illustrated in FIG. 6, the width ($w_1$) of one web, e.g., the first web 20, may be greater than the width ($w_2$) of the other web, e.g., the second web 22. Embodiments including helically extending webs may also have first and second webs of different widths. Additionally or alternatively, the webs of some corrugations may have different widths than the webs of other corrugations. For example, in the embodiment illustrated in FIG. 7, the fibrous structure includes first and second corrugations 18, 18a. The first corrugation 18 includes first and second webs 20, 22 which extend into one another at the crest 14, and have equal widths (w). The second corrugation 18a includes first and second webs 20a, 22a which have equal widths ($w_a$). However, as seen in FIG. 7, the width (w) of the first and second webs 20, 22 of the first corrugation 18 is different from the width ($w_a$) of the first and second webs 20a, 22a of the second corrugation 18a.

Figure 9A:
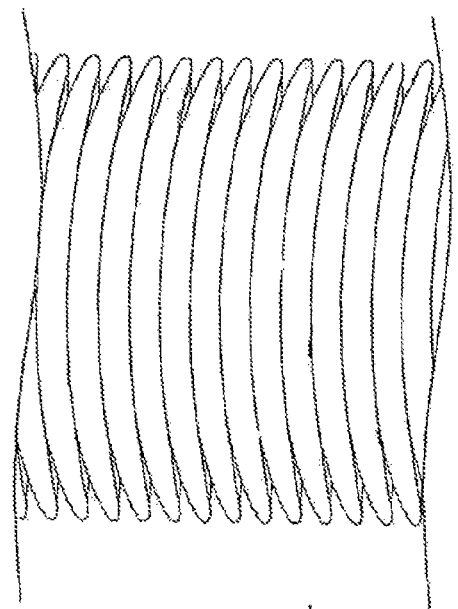
FIG. 9a is a side view of a portion of another fluid treatment pack.

In many helical and circumferential embodiments, the corrugated fibrous structure 12 of the fluid treatment pack may be collapsed to produce nested corrugations or may be collapsed or stretched or neither collapsed or stretched to produce non-nested corrugations. Some embodiments may include a corrugated fibrous structure having both nested and non-nested groups of corrugations. For non-nested corrugations 18, as shown in FIG. 8a, the projections of the crests 14 and troughs 16 onto the longitudinal axis of the fibrous structure 12 may form a uniform or non-uniform progression along the axis, as shown in FIG. 8b. The projection of a crest 14 lies intermediate the projections of the adjacent troughs 16, and vice versa. For nested corrugations, as shown in FIG. 9a, the projection of a crest 14 may lie outside of the projections of the adjacent troughs 16, and vice versa. Advantageously, collapsing the corrugated structure 12 with or without nesting the corrugations may provide increased surface area per unit length of fluid treatment pack over uncollapsed fluid treatment packs. For example, in some embodiments, e.g., a helical embodiment, the corrugated fibrous structure may be collapsed to about or less than ⅕ of the pitch of the uncollapsed corrugated fibrous structure.

Non-nested corrugations may comprise curved or straight webs that may or may not be in surface contact with adjacent webs, as shown, for example, in FIGS. 8a and 8b. In some embodiments, at least a portion of one or more webs may be in contact with an adjacent web. Some non-nested corrugations may have a depth (d) equal to the difference between the radial distance from the longitudinal axis of the fluid treatment pack to the crest and the radial distance from the longitudinal axis of the fluid treatment pack to the trough ($r_c - r_t$).

Figure 9B:
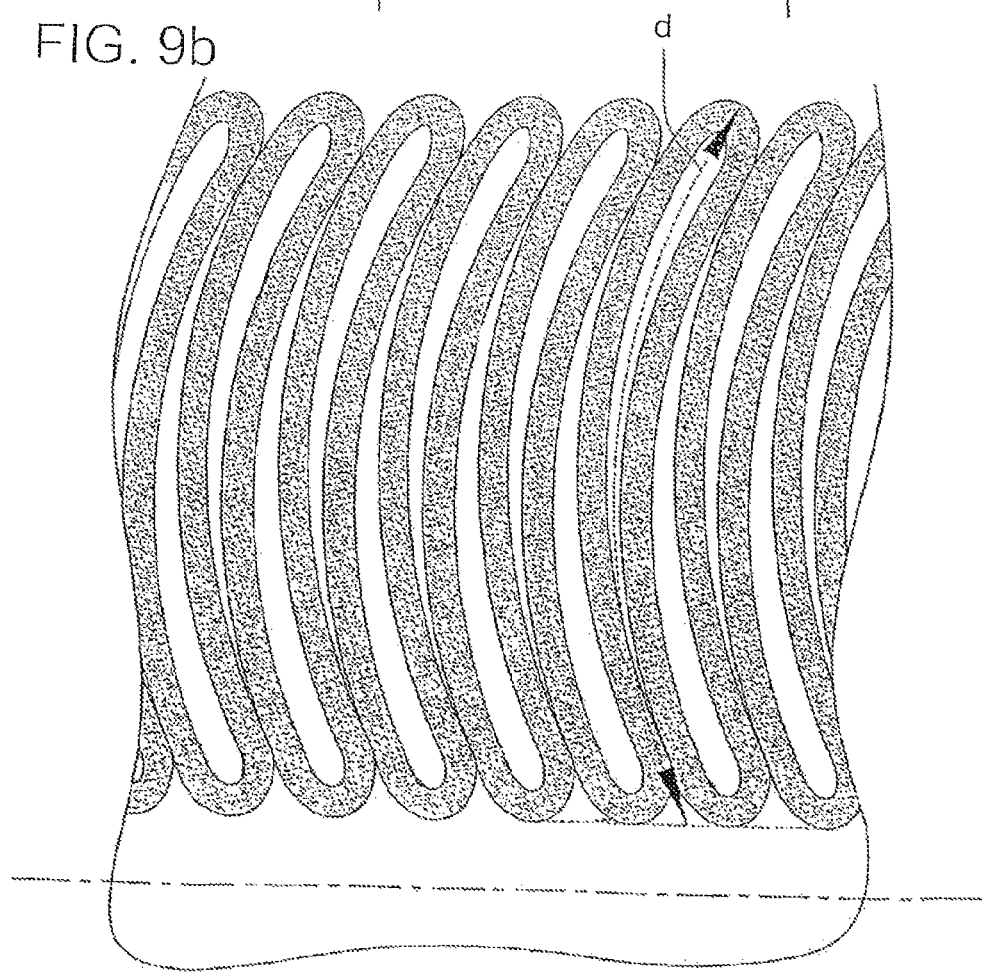

Nested corrugations may comprise curved or straight non-radial webs that may or may not contact an adjacent web along a portion of the web surface. Additionally or alternatively, nested corrugations may have some, but not all, webs in surface contact with adjacent webs. An exemplary embodiment of a collapsed fibrous structure 12 including nested corrugations 18 is shown in FIGS. 9a and 9b. As seen in FIGS. 9a and 9b, the webs 20, 22 are curved and are in contact with adjacent webs along some of the surface of the web. The nested corrugations may have a depth (d) equal to the distance from a crest to the corresponding troughs between and in a direction generally parallel to the surfaces of the adjacent webs. Fluid treatment packs including nested corrugations may include deeper corrugations than non-nested and uncollapsed fluid treatment packs. In some embodiments, corrugations 18 including first and second webs 20, 22 having different web widths, such as the corrugations illustrated in FIG. 6, may facilitate nesting of adjacent corrugations 18. However, fibrous structures including first and second webs having equal widths may also be collapsed to form nested corrugations.

Figure 10:
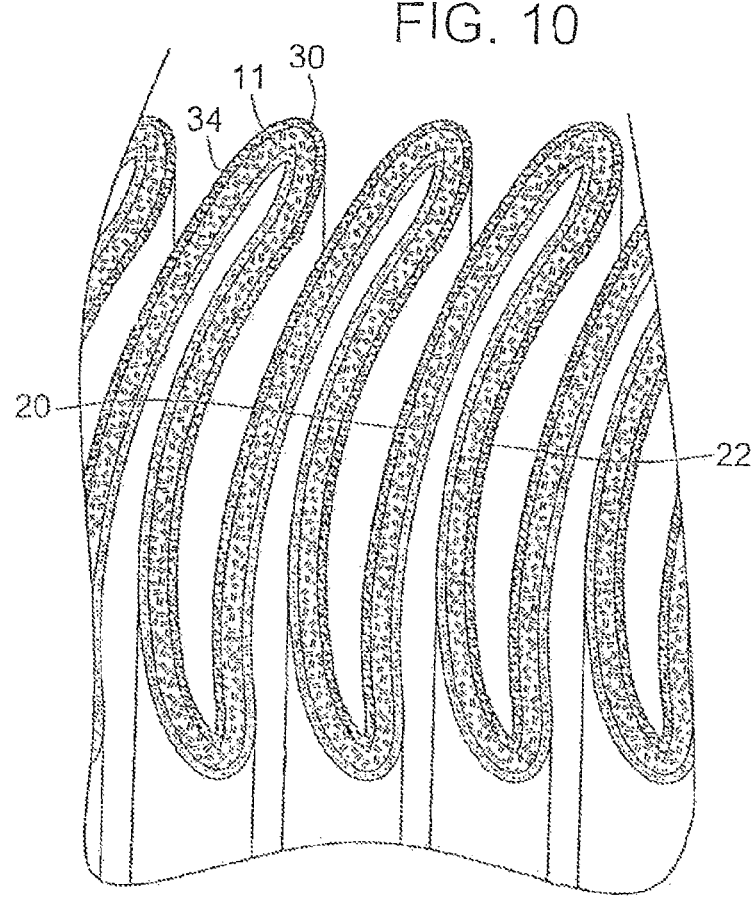
FIG. 10 is a section view of a portion of a fluid treatment pack having multiple regions.

The tubular fibrous structure including the webs may comprise only a fluid treatment region, or alternatively may include one or more regions in addition to the fluid treatment region. Adjacent regions may contact each other without being fixed to each other. Alternatively, adjacent regions may contact each other and may be fixed to each other, for example, by mechanical entangling or bonding the fibers of one region to the fibers of the adjacent region. Many fibrous structures may include one or more drainage regions on one or both sides of the fluid treatment region. Drainage regions may enable fluid to evenly flow to or from substantially all portions of adjacent webs, even if opposing surfaces of the webs contact one another. For example, in embodiments including nested corrugations, and particularly for tightly nested corrugations, adjacent webs may be in contact with one another. Drainage regions may be disposed along the exterior of the fluid treatment region of the fibrous structure, e.g., the upstream side when fluid flow is outside-in or the downstream side when fluid flow is inside-out, and/or may be disposed along the interior of the fluid treatment region of the fibrous structure., e.g., the downstream side when fluid flow is outside-in or the upstream side when fluid flow is inside-out. As seen in FIG. 10, a collapsed, nested fibrous structure 12 may include a first drainage region 30, a fluid treatment region 11, and a second drainage region 34 along each web 20, 22. The drainage regions 32, 34 may have a lower edgewise resistance to fluid flow than the fluid treatment region 11, for example, by having a more open structure such as a coarser pore size. Fluid then readily flows into and/or out of the corrugations 18 edgewise along the drainage regions 32, 34 and is more fully distributed along the fluid treatment region 11, even deep within a corrugation when the webs 20, 22 are in contact with one another.

Figure 11:
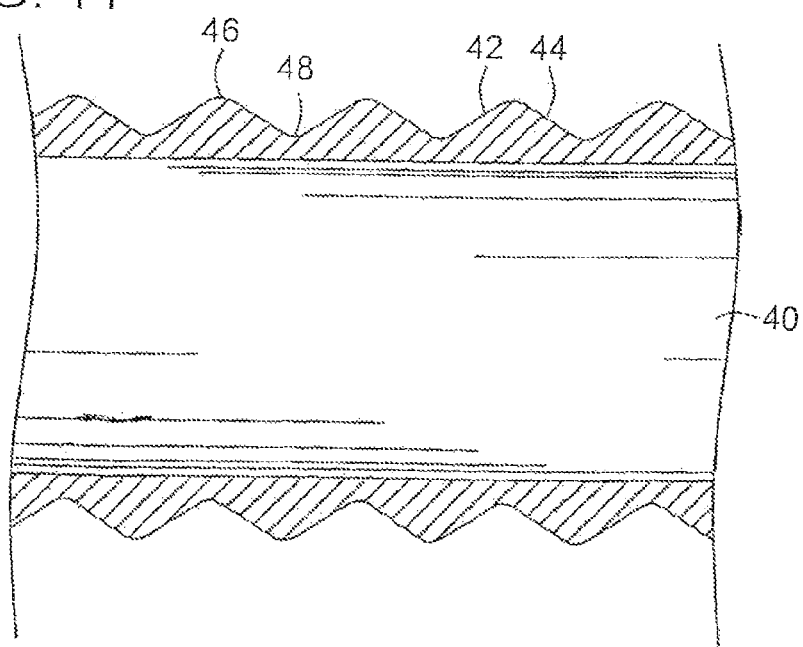
FIG. 11 is section view of a portion of a shaped mandrel.

The tubular fibrous structure may include additional regions. For example, the fibrous structure may also include one or more non-woven internal support regions disposed along the webs, for example, on the interior and/or the exterior of the fibrous structure. The support region may provide physical strength to the fibrous structure to resist axial, bending, or torsional forces and prevent the fibrous structure from collapsing inwardly or expanding outwardly under radial forces during use. The support region may also advantageously provide some fluid treatment, e.g., prefiltering, of the fluid Fluid treatment packs may be made in a wide variety of ways. An example of one method of making a fluid treatment pack comprises depositing fibers onto a shaped mandrel to form a non-woven, porous, tubular, corrugated fibrous structure. An example of a shaped mandrel is illustrated in FIG. 11. The illustrated shaped mandrel 40 includes first and second helically extending sloped regions 42, 44 which intersect one another along a helically extending mandrel crest 46 and/or a helically extending mandrel trough 48. The mandrel may have a single or multiple helix design. In other embodiments, the mandrel may include a plurality of circumferentially extending crests, circumferentially extending troughs, and circumferentially extending sloped regions extending between adjacent crests and troughs. The shaped mandrel may have any configuration suitable to produce a fibrous structure having any desired configuration, such as those previously described. For example, the shaped mandrel may include crests and troughs extending helically or circumferentially and having any suitable radial distance from the longitudinal axis of the mandrel. The crests and troughs may have equal or unequal radial distances and the sloped regions may have any suitable width (distance along mandrel surface between a crest and an adjacent trough), the widths being the same or different for different mandrel portions. Further, the sloped regions may be straight or curved and may extend at any desired angle to the longitudinal axis of the mandrel.

The shaped mandrel may comprise any suitable material. For example, the shaped mandrel may comprise a metal, such as stainless steel, or a polymeric material, such as polypropylene, formed to include the crests and troughs. The mandrel may have a one-piece configuration or a multi-piece configuration. For example, the mandrel may comprise radially extendable segments that may be retracted to facilitate removal of the fibrous structure. In other embodiments, the mandrel may be a standard cylindrical mandrel having a form, e.g., a triangular form, wound around the cylindrical mandrel to form the crests and troughs. The form may be rigid or may be inflatable and deflatable to facilitate removal of the fibrous structure. The mandrel may also include a coating, e.g., a non-stick coating, such as a Teflon® coating, to facilitate removal of the fibrous structure from the mandrel. The mandrel may be hollow or solid, although a hollow mandrel may be preferred in some embodiments to reduce the weight and cost of the mandrel.

Depositing fibers onto a mandrel having a tubular configuration, for example, by spinning, e.g., melt-spinning including melt-blowing, dry-spinning, or wet-spinning, advantageously produces a fibrous structure having a tubular configuration corresponding to the configuration of the mandrel. While some embodiments of fluid treatment packs may include one or more seams, the fluid treatment pack and the fibrous structure may be formed without the use of seams, including, for example, axially, helically or circumferentially extending seams. Seamless fluid treatment packs may reduce the potential leakage paths within the fluid treatment pack and, therefore, may be preferred in many embodiments.

In many embodiments, forming a non-woven web on a shaped mandrel may include melting and extruding one or more fiber-forming materials. However, in some embodiments, rather than melting a fiber-forming material, the material may be dissolved in a suitable solvent and extruded. Any number of fiber-forming materials may be used to produce the fibrous structure of the present invention. Exemplary fiber-forming materials include polymeric materials, such as, polyamides, polyacrylonitrile, polyesters, such as esters of ethylene glycol and terephthalic acid, and of 1,4-butene diol and dimethyl terephthalic acid or terephthalic acid, polychlorotrifluoro-ethylene, polyvinylidene chloride, polyvinyl chloride, copolymers of vinyl chloride and vinyl acetate, polyvinyl butyral, polyvinyl acetate, polystyrene, polyurethanes, polypropylene, polyethylene, polysulfone, polymethylpentene, polycarbonate, polyisobutylene, and polybenzimidazole, nylon 6, nylon 66, nylon 612, nylon 11, and a polyamide-polyether copolymer, such as a polyamide/polyalkylene-oxide-diamine copolymer, e.g., a nylon 6 copolymer described as "80% nylon 6 with 20% polyethylene-oxide diamine". Also suitable are cellulose derivatives, such as cellulose acetate, cellulose propionate, cellulose acetate-propionate, cellulose acetate-propionate, cellulose acetate-butyrate, and cellulose butyrate.

Fiber-forming material may be extruded using a spinning die containing one or more individual extrusion nozzles. Any conventional spinning die may be used. Such dies are available and are well known in the fiber-spinning art. The term "spinning die" will be understood to include spinning nozzles, spinnerettes, reservoirs faced with a plate including a plurality of orifices in any desired size and pattern, and centrifuges or rotors having a plurality of orifices about their periphery, through which the fibers are spun by centrifugal force. Fiberizers, rotating wheels and discs, and like materials are also included. In some embodiments, the method may include depositing the fibers to form the non-woven web on the mandrel as the nozzles and the mandrel are relatively rotated. For example, the mandrel may rotate at a suitable velocity, e.g., in a range from about 30 rpm to about 1000 rpm, e.g., from about 50 to about 700 rpm, while the nozzles are stationary or vice versa.

A die may include any suitable number of nozzles, which may be arranged in a single line or the nozzles may be offset from one another. The nozzles may be spaced from each other any suitable distance, for example a distance in the range of from about 0.4 cm or less to about 1.5 cm or more, and in some embodiments from about 0.6 to about 1.2 cm. In some embodiments, multiple row arrays of nozzles may be utilized. For example, the die may include, two, three, four or even more rows of nozzles. The multiple rows of nozzles may be oriented in any suitable manner. Orienting the nozzles to produce crossed fiber streams may be advantageous in some embodiments, for example as described in U.S. Pat. No. 6,074,869, which is incorporated herein by reference in its entirety.

The spinning dies may include nozzles positioned any suitable distance from the mandrel. In some embodiments, the nozzles may be spaced from about 1.5 cm or less to about 15 cm or more and more preferably from about 2 cm to about 12 cm from the mandrel. In many embodiments, due to the shape of the mandrel, the distance between the nozzles and the mandrel differs along the length of the mandrel. For example, the mandrel may include at least one crest and at least one trough, wherein the distance between a nozzle and a crest is different from the distance between a nozzle and a trough. However, in some embodiments, the nozzles may be arranged such that the distance between a nozzle and a crest is equal to the distance between a nozzle and a trough.

In many embodiments, as the fibers exit the nozzle they are contacted with a gas stream. For example, the gas stream may attenuate the fibers and carry them in the direction of the mandrel. In some embodiments, such as when the fibers are melt-blown, the gas stream may be configured to break up and disrupt the fibers into discontinuous lengths as they exit the nozzle. The lengths of the fibers can be affected by adjusting the velocity and volume of the gas stream. In other embodiments, such as in melt-spinning applications, the gas stream may attenuate without disrupting the fibers, such that the fibers may reach the mandrel with a molten portion still attached to the nozzle, e.g., as continuous filaments. Thus, the term "fibers" will be understood to include filaments as well as shorter fibers. The gas stream may also be heated to retard the cooling of the molten fibers or may be cooled to accelerate the cooling of the fibers and thereby affect their rate of solidification. For example, if the fibers are kept hotter longer (e.g., with a heated gas stream), the attenuation is increased and if the fibers are cooled more rapidly (e.g., with a cooled gas stream) the attenuation is decreased. Thus, some control over the length and diameter of the fibers may be obtained. In other embodiments, such as when the fibers are dry-spun, the gas stream may facilitate evaporation of the solvent to solidify the fibers.

The gas stream may be directed in any of numerous orientations with respect to the fibers. In some embodiments, the gas stream may be directed generally in the direction of projection of the fibers. For example, the gas stream may be emitted through openings arranged circumferentially about the individual orifices or array thereof. The openings may be adapted to discharge the gas at a high, but controlled velocity, along the central axis of the orifice. In other embodiments, the gas stream may be directed in the direction generally perpendicular to the projection of the fibers. As set forth above, conventional dies including gas-delivering arrangements are well known in the fiber-spinning art.

In some embodiments, the gas stream may contact a molten polymer before it exits the nozzle, fragmenting the polymer stream into tiny droplets which are then carried out of the nozzle and elongated into fibers by the air stream. Fibers formed in accordance with such an embodiment may have a more controlled orientation than fibers which are disrupted external to the nozzle. A detailed description of such a process and suitable nozzle configuration is provided in U.S. Pat. No. 6,074,869.

In some embodiments, depositing fibers to form a non-woven web on a shaped mandrel may include extruding fibers using more than one spinning die. For example, in an embodiment, at least one additional die may be disposed in spaced relationship from the other die(s). Fibers extruded through the additional die(s) may issue from the additional die and be presented to the stream of fibers from the other die(s), prior to or after being deposited on the shaped mandrel. The streams of fibers issuing from the different dies may become entrained with one another. In some embodiments, fibers issuing from an additional die may be deposited on a roller, e.g., a collection/transfer roller, and be transferred from the roller to the shaped mandrel. In some embodiments, the fibers may issue from the additional die at an elevated temperature and/or the collection/transfer roller may be heated to maintain the fibers in an at least partially molten state, so that they may melt-bond with fibers issuing from the other die(s). A detailed description of forming non-woven webs using more than one die is provided in U.S. Pat. No. 5,591,335, which is incorporated in its entirety herein by reference.

Fibers, e.g., discontinuous fibers and/or continuous filaments, having a wide range of diameters may be deposited on the shaped mandrel to form the non-woven web. For example, the fibers may have diameters of from about 1.5 microns or less to about 150 microns or more. Fibrous structures including fibers having nominal diameters of from about 15 microns to about 50 or 100 microns or larger may be generally less flexible and have larger pore sizes than fibrous structures including fibers having nominal diameters of less than about 15 microns. In some embodiments, fibers having nominal diameters of less than about 15 microns, for example, from about 3 to about 8 microns may be deposited on the shaped mandrel. In other embodiments, fibers having nominal diameters as small as about 1.5 microns, or less than about 1 micron, e.g., about 0.5 microns, may be deposited on the shaped mandrel.

In some embodiments, the method may include depositing fibers have varying nominal diameters. For example, fibers having different nominal diameters may be randomly deposited onto the shaped mandrel or deposited in a particular orientation. Fibers having different nominal diameters may be deposited in equal or differing proportions onto the mandrel, and may be deposited to produce different regions or layers of the fibrous structure. In some embodiments, fibers having different nominal diameters may be deposited to produce a graded orientation, e.g., to provide a fluid treatment region having a decreasing or increasing pore size through the region. Alternatively or additionally, fibers having different nominal diameters or different distributions of nominal diameters may be deposited to produce different regions of the fibrous structure. For example, in some embodiments, fibers having a first nominal diameter may be deposited to produce a first layer or region and fibers having a second different nominal diameter may be deposited to produce a second layer or region. Additional layers or regions, which may include fibers of a different nominal diameter or fibers having a nominal diameter equal to the nominal diameter of fibers in another region may also be deposited on the shaped mandrel. In one embodiment, the method may include depositing fibers to form a non-woven web having three regions, a first region including fibers having a first nominal diameter, a second region including fibers having a distribution of nominal diameters, and a third region including fibers having the first nominal diameter. The first and third regions may comprise drainage regions, support regions, cushioning regions, or spacer regions, and the second region may comprise a fluid treatment region, and the fibers of the fluid treatment region may have a smaller diameter than the fibers of the first and third regions.

The fibers may be deposited to form a non-woven web on the shaped mandrel until a fibrous structure having a suitable number of regions and a suitable thickness is obtained. For example, the thickness of the fibrous structure may be from about 0.01 inches or less to about 0.5 inch or more. Depositing the fibers may include forming multiple deposits, where each deposit may comprise fibers of different diameters and/or different materials for example. Each deposit may correspond to a different region of the fibrous structure, and the fibrous structure thickness may include the thickness of the multiple regions, such as a non-woven fluid treatment region and non-woven drainage regions. For example, a fibrous structure may include a fibrous fluid treatment region comprising from about 10% or less up to about 100% of the fibrous structure thickness and a non-woven drainage region comprising up to about 90% of the fibrous structure thickness.

In some embodiments, for example those embodiments utilizing melt-blowing, the fibers may be mechanically entangled as they are deposited on the mandrel, which may provide adequate structural integrity for the fibrous structure. However, in other embodiments, the fibers may be bonded to one another using any of a variety of techniques and/or bonding agents. For example, in some embodiments fibers may be deposited on the mandrel while they are at least partially molten, e.g., tacky, to achieve fiber-to-fiber bonding. Additionally or alternatively, the fibers may be bonded using a bonding agent, such as a resin or a solvent. The bonding agent may be applied in any suitable manner and as is known in the art.

Once the fibrous structure is formed, it may be removed from the mandrel in a variety of ways. In some embodiments, the fibrous structure may be continuously withdrawn from the mandrel, for example, as the mandrel is rotating and the fibers are being deposited. For example, in embodiments including a helically extending corrugation or corrugations, the fibrous structure may be rotated faster or slower or even in a direction counter to the rotation of the mandrel, to "unscrew" the fibrous structure from the mandrel. Alternatively, in some embodiments, the fibrous structure may not be continuously removed from the mandrel, but rather may be removed after a discrete length of media is formed. For example, the fibrous structure may be removed, e.g., by "unscrewing" the fibrous structure from the mandrel or sliding the fibrous structure along the longitudinal axis of the mandrel, after the fibers have been deposited and while the mandrel is stationary. In some embodiments, an adjustable, e.g., retractable or deflatable, mandrel may facilitate removal of the structure from the mandrel. For example, an adjustable mandrel may be retracted after depositing the fibers to facilitate removal of the fibrous structure from the mandrel. In some embodiments, an adjustable mandrel may be expandable and may be expanded during melt-blowing and retracted after melt-blowing to facilitate removal of the fibrous structure from the mandrel.

In some embodiments of the invention, the method may include embossing the webs of the fibrous structure. The fibrous structure may be embossed using any known suitable technique and in any suitable region(s) of the fibrous structure. However, for many embodiments the fibrous structure is unembossed. For example, the webs may be substantially free of compressed regions or distortions that reduce the filtering capability of the fibrous structure. A corrugated fluid treatment pack including unembossed webs advantageously provides more surface area for fluid treatment than embossed fibrous fluid treatment media, since embossing may close off areas of the fluid treatment media.

In some embodiments, the method of making the fluid treatment pack may further include axially collapsing the corrugations of the corrugated fibrous structure, for example, by pressing the corrugations against one another. The corrugated fibrous structure may be collapsed after forming the non-woven web to produce a fluid treatment pack including nested or non-nested corrugations. For example, the corrugated fibrous structure may be collapsed as the fibrous structure is being drawn off the mandrel. Alternatively, the corrugated fibrous structure may be drawn off the mandrel and subsequently collapsed. In some embodiments, the method may further include fixing the collapsed fibrous structure to maintain the collapsed configuration. For example, after collapsing the fibrous structure, the fibrous structure may be heat-set to assist in maintaining the collapsed configuration of the fibrous structure. Heat-setting parameters are dependent on the particular polymer utilized in forming the fibers, and determination of these parameters are within the ordinary skill of one in the art. For example, a polypropylene fibrous structure may be heat-set at a temperature of about 130° C. for about one hour. Preferably, heat setting the fibrous structure to maintain the collapsed configuration does not produce distortions that reduce the filtering capability of the web. Heat-setting may also be performed prior to removal from the mandrel. For example, in some embodiments, portions of the fibrous structure may be stretched during removal from the mandrel. Heat-setting prior to stretching the fibrous structure may facilitate the return of the fibrous structure to its pre-stretched state.

The fibrous structure comprising the fluid treatment pack may be combined with other elements to make a fluid treatment element. For example, in some embodiments, end caps, including open or blind end caps may be disposed at one or both ends of the fluid treatment pack. The end caps may have any configuration and be formed of any material adapted to seal the ends of the fluid treatment pack and prevent bypass of the fluid to be treated around the fluid treatment pack. The end cap(s) may have a radial distance greater than, equal to or even less than the radial distance of the crest(s) or the trough(s). In some embodiments, the end caps may have a radial distance intermediate the radial distance of the crest(s) and the trough(s). The end caps may comprise a polymeric material or a non-polymeric material, e.g., a metal. In some embodiments, the end caps may comprise a polymeric material which may be melt bonded to the fluid treatment pack. In some embodiments, the end caps may be fixed to the fluid treatment pack by a potting compound, such as an adhesive, or by any other suitable method.

The fluid treatment pack may also be combined with other components to make a fluid treatment element. For example, additional layers, such as drainage layers, spacer layers, and/or cushioning layers, may be associated with the fibrous structure as separate members. Such additional layers may be associated with the fibrous structure in any suitable manner. In some embodiments, a drainage layer may be wrapped, e.g., circumferentially or helically wound, around the exterior of a fibrous structure. For example, a drainage layer may be wound around the corrugations including around the crests, troughs, and webs to overlie the fibrous structure. Additionally or alternatively, a separate drainage layer may be wrapped around the mandrel prior to depositing the fibrous structure on the mandrel. In some embodiments, additional layers may be positioned as inserts between the corrugations of a fibrous structure, for example, prior to collapsing the corrugations.

A separate core and/or a surround may also be associated with the fluid treatment pack to produce a fluid treatment element. For example, a core may be located in the hollow center of the tubular fibrous structure. The core, when present, may have any configuration which enables it to support the fibrous structure and transport fluid in the desired manner. For example, in some embodiments, a core may be a tubular member having a hollow center and perforations, pores, or other openings in its periphery through which fluid can flow between an end of the core via the interior of the core and the exterior of the fibrous structure. Alternatively, the core may be a solid member having channels or other passageways in its periphery along which fluid can flow between an end of the core and the exterior of the fibrous structure. Further, the core may or may not be contoured to match the crests and troughs of the fibrous structure. The core may be inserted within the hollow center of the fibrous structure and fixedly associated with the fibrous structure by a friction fit, by joining the core to an end cap, or by any other suitable method. A surround, such as a cage, a netting, or a web, may be located around the exterior of the fibrous structure. The surround may be porous or perforated or may have other openings along all or most of its length allowing fluid to pass between the exterior of the surround and the fibrous structure. The surround may be positioned around the fibrous structure and fixedly associated with the fibrous structure in any suitable manner, such as by attachment to one or both end caps. Alternatively, the surround, as well as the core, may be removably rather than fixedly associated with the fibrous structure.

In some embodiments, the fluid treatment pack may include a fibrous structure combined with a membrane. The term "membrane" will be understood to include any porous, permeable or semipermeable membrane generally formed from natural or synthetic polymeric material. The membrane may have a removal rating in the range of about 20 microns or more down to a rating which will remove dissolved substances of molecular weights as small as 10,000 Daltons or less. The pore structure may be constant or may vary across the membrane thickness. The membrane may be skinned or skinless; supported or nonsupported; liquiphilic or liquiphobic; and/or charged or neutral.

The membrane may be associated with the fibrous structure in any suitable manner. For example, a membrane may be integrally formed with the corrugated fluid treatment pack. Additionally or alternatively, a pre-formed membrane may be mounted to the corrugated fibrous structure. Any of the features described above may be combined with the membrane, for example, corrugated fibrous fluid treatment packs including, for example, helically or circumferentially extending corrugations, collapsed or uncollapsed corrugations, nested or non-nested corrugations, constant or varying fiber diameters, single or multiple layers or regions and/or constant or varying radial distances and web widths. Where the membrane serves as the primary mechanism for treating the fluid, the fibrous structure may or may not include a non-woven fluid treatment region.

In some embodiments, a membrane may be integrally formed with the corrugated fibrous structure by casting and precipitating the membrane on the corrugated fibrous structure, which then serves as a membrane support. U.S. Pat. Nos. 4,340,479 and 5,143,616 disclose examples of methods for casting and precipitating membranes and is incorporated herein by reference in its entirety. A casting solution containing a dissolved resin may be applied to the corrugated fibrous structure, before, after or even during removal of the fibrous structure from the mandrel. The casting solution may be applied in any suitable manner, for example it may be spread or sprayed onto the fibrous structure, or the fibrous structure may be dipped or even immersed in a bath of casting solution. For example, the fibrous structure may be removed from the mandrel and passed to a bath of the casting solution as a continuous process. Alternatively, a discrete length of the fibrous structure may be removed from the mandrel and subsequently immersed in a bath of the casting solution.

The casting solution may include a resin and a solvent for the resin, or it may include the resin, a solvent for the resin, and additional components, such as a non-solvent for the resin. The resin may comprise any suitable resin that can dissolve in a solvent and then precipitate to form the membrane. Exemplary resins may include polyamides, such as nylon 46, 6, 66, 7, 69, 610, 612, 11, and 12 or mixtures thereof, polyvinylidene difluoride (PVDF), and polysulfones, such as polyethersulfones.

The solvent may comprise any solvent capable of dissolving the resin and is preferably selected based on the desired resin for the membrane. The solvent may also comprise a non-solvent for the fibers of the fibrous structure. For many embodiments, the fibers of the fibrous structure may be unaffected or only slightly affected by the solvent, as well as the other components, of the casting solution. Solvents for polyamides are well known, as shown in U.S. Pat. No. 4,340,479. An exemplary solvent capable of dissolving nylon is formic acid. Solvents capable of dissolving PVDF include acetone, dimethyl acetamide, dimethyl formamide, dimethyl sulfoxide, and similar solvents. Solvents for polysulfones, such as polyethersulfones include dimethyl acetimide, a mixture of dimethylacetimide and propionic acid, a mixture of n-methyl-2-pyrolidone and propionic acid, formamide, dimethyl sulfoxide, cyclohexanone, and the like.

A non-solvent, if present, may comprise any substance that will not substantially dissolve the resin. In some embodiments, the non-solvent may be water or may be soluble in water. An exemplary non-solvent for use with polyamides is water, formamides, and acetamides, as well as polyols such as glycerol, glycols, polyglycols, and ethers and esters thereof, and mixtures of such compounds.

The corrugated fibrous structure may be wetted by the casting solution completely so that the casting solution completely penetrates the thickness of the fibrous structure. Alternatively, the casting solution may partially penetrate the thickness of the fibrous structure or may remain, for example, as a thin layer on the surface. The wettability of the fibrous structure may be determined by the wetting characteristics of the casting solution and the fibers comprising the fibrous structure. Polypropylene or polyethylene fibers have poor wetting characteristics and thus may provide a fibrous structure that is not fully wetted by some casting solutions, while polyesters, aromatic polyamides, and cellulose fibers have good wetting characteristics and may provide a fibrous structure which is more wettable by a casting solution.

Excess casting solution may be removed from the corrugated fibrous structure. The excess solution may be removed using any suitable mechanism. For example, the excess solution may be spun off or scraped using doctor blades.

After applying the casting solution to the fibrous structure, the membrane may be formed by precipitating the resin onto or within the fibrous structure. The resin may be precipitated by decreasing the concentration of the solvent in the casting solution, for example, by evaporation under controlled conditions. Additionally or alternatively, a precipitating solution, which may include a non-solvent or both the solvent and a non-solvent, may be applied to the fibrous structure with the casting solution. The precipitating solution may be applied in any suitable manner, such as by spraying or by dipping or immersing the fibrous structure with the casting solution in a precipitating solution bath.

The precipitating solution preferably includes a solvent in a concentration lower than the solvent concentration in the casting solution. As the precipitating solution is applied to the fibrous structure and the casting solution, the non-solvent in the precipitating solution may diffuse into the casting solution while the solvent in the casting solution may diffuse into the precipitating solution. Consequently, the solvent concentration in the casting solution decreases and the resin begins precipitating. The resin precipitates and preferably forms the membrane within the openings between the fibers in the fibrous structure and/or on the surface of the corrugated fibrous structure.

A membrane may be integrally formed with the corrugated fibrous structure in other ways. For example, a separate substrate may be placed in contact with the corrugated fibrous structure and a casting solution may be applied to the separate substrate, either before or after the substrate contacts the fibrous structure and the membrane may then be precipitated from the casting solution while the saturated substrate is in contact with the corrugated fibrous structure.

The substrate may comprise any of a variety of porous materials. Exemplary substrate materials may include polyesters, polypropylene, polyamides, cellulose esters, woven glass fiber fabric, and similar materials. The substrate material may have any suitable configuration. In some embodiments, the substrate may be in the form of a sheet, such as a web, a netting, a mesh, a screen or a woven or non-woven sheet formed from fibers or filaments. A substrate in the form of a sheet may be advantageous, for example, in order to minimize the thickness of the membrane. Alternatively, the substrate may have other configurations, for example, a flattened cylinder. Preferably, the substrate is flexible enough to conform to the surface of the corrugated fibrous structure but resilient enough to withstand the forces associated with saturating the substrate with casting solution and positioning the substrate on the corrugated fibrous structure.

For some embodiments, a substrate saturated with the casting solution may be placed in contact with the corrugated fibrous structure. After applying the casting solution to the substrate, excess casting solution may be removed and the saturated substrate may be placed in contact with the exterior or interior surface of the fibrous structure. For example, the saturated substrate may be wrapped, e.g., helically wound, around the corrugated fibrous structure. The substrate may be placed in contact with the corrugated fibrous structure while the corrugated structure is positioned on the mandrel or after it has been removed from the mandrel. In some embodiments, the saturated substrate may be placed in contact with the fibrous structure while the fibrous structure is being removed from the mandrel. For example, the saturated substrate may be wrapped around the fibrous structure as the mandrel rotates and the corrugated fibrous structure is removed.

The solvent in the casting solution preferably does not affect or only slightly affects the substrate. In some embodiments, the fibrous structure may comprise fibers which are at least slightly soluble in or softened by the solvent in the casting solution. For example, a portion or substantially all of the fibers comprising the fibrous structure may be slightly soluble or softened by the solvent. The soluble fibers may be the same polymeric material as the resin in the casting solution or a different material which is also soluble in the casting solution solvent. Preferably, the substrate is completely and evenly saturated, such that when the substrate is placed in contact with the fibrous structure, the fibrous structure and the substrate may be solvent bonded.

In order to form the membrane, a precipitating solution may be applied to the saturated substrate and fibrous structure. The precipitating solution may be applied in any suitable manner as described above. Upon application of the precipitating solution, the resin begins precipitating within the openings in and/or on the surface of the substrate. Additionally, the resin may precipitate within and/or on the openings of the fibrous structure to further fix the membrane to the fibrous structure. In some embodiments, as the resin is precipitating, the slightly dissolved fibrous structure begins reforming to further integrate the membrane with the corrugated fibrous structure.

After precipitating the membrane directly on the fibrous structure or on the substrate, the membrane may be washed and dried. For example, the membrane may be washed with water or with any volatile liquid in which the solvent is soluble and which can be removed during drying.

The corrugated fluid treatment pack including the fibrous structure and the membrane may be combined with any of the elements described above to provide a fluid treatment element, including, but not limited to, a core, a surround, and/or one or more end caps. A fluid treatment element, in turn, may be incorporated in a fluid treatment system.

In some embodiments, the corrugated fibrous structure may be combined with a preformed membrane, e.g., a membrane cast and precipitated, a membrane which is formed by sintering and or stretching, or a membrane formed in any other manner. For example, a membrane may be cast and precipitated on a substrate as described above, washed and dried, and then applied to the corrugated fibrous structure. The preformed membrane may be combined with the corrugated fibrous structure in any suitable manner. For example, the preformed membrane may be wrapped, e.g., circumferentially or helically wound, around the corrugated fibrous structure to overlie and conform to the configuration of the crests, troughs, and webs of the corrugated fibrous structure. In some embodiments, the membrane may be fixed to the fibrous structure. For example, the membrane may be secured to the fibrous structure, e.g., by melt, solvent, or adhesive bonding. The membrane may be combined with the corrugated fibrous structure before, after or during removal of the fibrous structure from the shaped mandrel.

Regardless of how the membrane is associated with the fibrous structure, the membrane may be additionally treated. For example, a membrane may be treated to modify various characteristics of the membrane. For example, the surface of the membrane may be modified in any suitable manner to change the surface charge and/or wettability of the membrane or to modify the binding characteristics of the membrane.

A fluid treatment element may be combined with one or more other elements or apparatuses to form a fluid treatment system. For example, the fluid treatment element may be combined with a source of feed fluid, pumps, valves, pipes, and/or other fluid treatment devices to form a fluid treatment system.

While various aspects of the invention have previously been described and illustrated in the Figures, the invention is not limited to these embodiments. For instance, one or more features of embodiments may be modified without departing from the scope of the invention. For example, in some embodiments, the fluid treatment pack and fibrous structure may have a non-circular cross-section. The generally tubular fluid treatment pack and fibrous structure may have any suitable cross-section, such as oval, polygonal, or even square. In some embodiments, the fluid treatment pack may not be removed from the mandrel. For example, in some embodiments, the mandrel may comprise a core, e.g., a perforated core, which remains within the fluid treatment pack.

Further, one or more of the features of these embodiments may be eliminated without departing from the scope of the invention. In some embodiments, the fibrous structure may be eliminated. For example, a porous membrane may be cast and precipitated on a substrate, as described above, and the substrate may be placed in contact with the shaped mandrel. The shaped mandrel may comprise a support structure around which the membrane is secured, e.g., physically attached or bonded. Thus, in many embodiments the membrane may not be removed from the shaped mandrel. A substrate may be wrapped, e.g., circumferentially or helically wound, around the shaped mandrel to overlie and conform to the configuration of the crests, troughs, and sloped regions of the mandrel, either before or after applying the casting solution to the substrate, and the membrane may be precipitated from the casting solution while the saturated substrate is in contact with the shaped mandrel. In some embodiments, the surface of the shaped mandrel may be at least slightly soluble in the solvent in the casting solution so that the membrane may be solvent bonded to the shaped mandrel. For example, the shaped mandrel may comprise a polymeric material which is soluble in the casting solution solvent, e.g., may comprise the same polymeric material as the resin in the casting solution. Additionally or alternatively, the membrane may be secured to the shaped mandrel in other ways, e.g., by melt or adhesive bonding. U.S. Pat. No. 5,143,616 discloses methods of forming a membrane on a support and is hereby incorporated by reference in its entirety. In some embodiments, the substrate may be wrapped around the shaped mandrel after the membrane has been formed, e.g., cast and precipitated, on the substrate. Additionally, a preformed membrane including a membrane formed by sintering and/or stretching or formed in any other manner may be wrapped around the shaped mandrel. The preformed membrane may be secured to the shaped mandrel, for example, by melt, solvent or adhesive bonding.

In some embodiments, the substrate or preformed membrane may be wrapped about the shaped mandrel in a plurality of turns and an overlap may or may not be present between adjacent turns of the substrate or preformed membrane. The wrapped substrate or preformed membrane preferably conforms to the shape of the mandrel such that the membrane formed thereon includes one or more corrugations, including one or more crests, one or more troughs, and first and second porous regions extending into one another at a crest and/or a trough.

The fluid treatment pack including the corrugated membrane may include any of the features described above except the fibrous structure. For example, the corrugated fluid treatment pack including a corrugated membrane may include helically or circumferentially extending corrugations, including one or more crests and one or more troughs and first and second porous regions extending into one another at a crest and/or a trough. The corrugated membrane may include collapsed or uncollapsed corrugations, nested or non-nested corrugations, single or multiple layers or regions and/or constant or varying radial distances and web widths.

In some embodiments, the corrugated fibrous structure may not be collapsed to produce nested or non-nested corrugations. The uncollapsed fibrous structure may be combined with one or more elements, such as end caps, a membrane, a core, and/or a surround to produce a fluid treatment element.

Further, one or more features of one embodiment may be combined with one or more features of other embodiments without departing from the scope of the invention. For example, in some embodiments, the fluid treatment pack may include a fibrous structure having a distribution of fiber diameters or regions of differing diameters in combination with separate drainage, spacer and/or cushioning layer(s) associated with the pack. A fluid treatment pack including a fibrous structure having a distribution of fiber diameters and/or separate drainage, spacer, and/or cushioning layer(s) may also be combined with an integrally formed or separately formed membrane. In some embodiments, two or more membrane layers may be combined with the corrugated fluid treatment pack. For example, a fluid treatment pack including an integrally formed membrane may be contacted with one or more additional membranes formed on separate substrates, while the membranes are still wet. Drying the wet membranes in contact with one another may join the membranes to one another to form a multi-layer structure.

Further, the invention is not limited to the previously described method of making a fluid treatment pack. For example, in some embodiments, forming a porous structure on a shaped mandrel may include wet-laying fibers or particulates on the shaped mandrel. U.S. Pat. No. 5,149,360 discloses examples of wet-laying processes and is incorporated herein by reference in its entirety. Staple fibers, i.e., preformed fibers, and/or particulates may be entrained in a fluid, such as water or air, to form a suspension, and the fibers and/or particulates may be deposited on the interior or the exterior of the shaped mandrel. In these embodiments, the shaped mandrel may include openings or perforations through which the suspending media may freely pass, but which restrict the passage of the suspended fibers or particulates. For example, the shaped mandrel may comprise a mesh or screen formed to include helically or circumferentially extending corrugations, crests, troughs, and sloped regions. In some embodiments, an additional layer, e.g., a mandrel surrounding layer, which surrounds and corresponds to the shape of the mandrel, i.e., overlies to include the corrugations, crests, troughs, and sloped regions, may include openings or passageways through which the suspending media may freely pass. As the suspending media passes through the openings, the fibers and/or particulates retained by the mandrel or by the mandrel surrounding layer are deposited on the corrugations including on the sloped regions, the crests, and the troughs, to form a tubular corrugated, porous, e.g., fibrous, structure.

Directing the suspension to the shaped mandrel and driving the suspending media through the openings may be achieved in a variety of ways. In many embodiments, a pressure differential may direct the suspension to the mandrel. For example, the pressure surrounding the mandrel may be increased and/or the pressure inside the mandrel may be decreased to direct the suspension to the mandrel and drive the suspending media through the openings. In another embodiment, the pressure surrounding the mandrel may be decreased and/or the pressure inside the mandrel may be increased, and the fibers or particulates may be wet-laid on the corrugations, including the crests, troughs, and sloped regions, on the inside of the mandrel, while the suspending media is driven outwardly.

The suspending media which has passed through the mandrel or mandrel surrounding layer may be removed in a variety of ways, for example, through the center of the mandrel. In some embodiments, the suspending media may be removed along channels formed in the mandrel, for example, suspending media which has passed through openings in the mandrel surrounding layer may flow along channels in the mandrel and be removed.

In some embodiments, after the fibers and/or particulates are wet-laid on the mandrel or mandrel surrounding layer, e.g., on the corrugations, including the crests, troughs, and sloped regions, the resulting fibrous structure may be additionally treated. For example, the fibrous structure may be dried to remove any remaining suspending media. Additionally or alternatively, the fibrous structure may be additionally treated to further bond the fibers or particulates, such as by the application of heat, pressure, and/or bonding agents.

In other embodiments, a method of making a fluid treatment pack may include wrapping a fibrous, e.g., woven or non-woven, material around a shaped mandrel to form a corrugated fibrous structure. Wrapping a fibrous material around the mandrel may include wrapping one or more of a variety of fibrous layers around the shaped mandrel, or around a porous structure previously formed on the shaped mandrel, including around the corrugations, the crests, the troughs, and the sloped regions of the mandrel. Wrapping may include circumferentially or helically winding a fibrous material around the shaped mandrel to overlie and conform to the configuration of the corrugations, including the crests, troughs and sloped regions. In some embodiments, a strip, e.g., a piece having a length greater than its width, of fibrous material may be wound around the shaped mandrel in a plurality of turns to overlie and conform to the configuration of the shaped mandrel. The strip of fibrous material may be wound around the shaped mandrel while the mandrel is rotating and the strip is rotating or stationary, or while the mandrel is stationary and the strip of material is rotating. The strip may have a variety of widths, for example, the fibrous material may have a width greater than, equal to or less than the width of the sloped regions of the mandrel. The fibrous material may be wrapped around the shaped mandrel to include a plurality of turns having a pitch greater than the width of the fibrous layer and a gap may be present between adjacent turns. However, the gap preferably is not present in the fluid treatment pack, e.g., additional wrapping or an additional layer may overlie and close the gap. Alternatively, the pitch may be less than the width of the fibrous layer and an overlap may be present between adjacent turns. In some embodiments, the pitch may be equal to the width of the layer and neither a gap nor an overlap may be present, although in some embodiments, it is preferred that at least a slight overlap is present between adjacent turns of at least one layer of the fibrous structure. A fibrous layer wrapped around a shaped mandrel including a helically extending corrugation may have a pitch equal to, less than or greater than the pitch of the helical mandrel corrugation. The fibrous layer may be wrapped in a plurality of turns having a constant or varying pitch along the longitudinal axis of the fibrous structure.

Any of a myriad of fibrous materials may comprise a suitable fibrous layer. For example, woven and non-woven sheets, laminates, flattened cylinders, webs, and/or meshes, may be wrapped around the shaped mandrel to form a fibrous structure. The fibrous material may include fibers comprising any of numerous materials, including any of the polymeric materials described above, fiberglass and/or metallic material, e.g., metal powder or metal fibers.

The corrugated fluid treatment pack including the wrapped fibrous material may include any of the features described above. For example, the fibrous structure may include a single layer or multiple layers, including one or more fluid treatment layers, drainage layers, spacer layers, cushioning layers, and/or support layers, and any of the layers may have any of the features described above, such as a distribution of fiber materials and/or fiber diameters or regions of differing fiber materials and/or fiber diameters. Multiple layers may be separately formed and wrapped around the mandrel, i.e., simultaneously or sequentially wrapped, or may be integrally formed. The wrapped fibrous structure may include helically or circumferentially extending corrugations, collapsed or uncollapsed corrugations, nested or non-nested corrugations, and constant or varying radial distances and web widths. The wrapped fibrous structure may be combined with one or more elements, such as end caps, a membrane, a core, and/or a surround to produce a fluid treatment element.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. A method of making a fluid treatment pack comprising depositing fibers to form a non-woven fibrous structure on a shaped mandrel having a longitudinal axis and a plurality of circumferential corrugations, including respectively forming first and second circumferentially extending non-woven webs on first and second circumferentially extending sloped regions of each corrugation, and extending the first and second webs into one another along one of a circumferentially extending crest and a circumferentially extending trough and into adjacent webs on adjacent corrugations at the other of the circumferentially extending crest and circumferentially extending trough to form a porous, tubular, circumferentially-corrugated fibrous structure, wherein depositing fibers to form the fibrous structure includes relatively rotating the shaped mandrel and one or more dies arranged to direct fibers onto the first and second circumferentially extending sloped regions of the relatively rotating shaped mandrel to form the first and second circumferentially extending non-woven webs extending into one another along the circumferentially extending crests and troughs.

2. The method of claim 1 wherein relatively rotating the shaped mandrel and the one or more dies includes rotating the shaped mandrel.

3. The method of claim 1 wherein depositing fibers includes depositing at least one of discontinuous fibers and continuous filaments to form the porous fibrous structure.

4. The method of claim 2 wherein depositing fibers includes depositing at least one of discontinuous fibers and continuous filaments to form the porous fibrous structure.

5. The method of claim 1 further comprising removing the tubular circumferentially corrugated fibrous structure from the shaped mandrel.

6. The method of claim 2 further comprising removing the tubular circumferentially corrugated fibrous structure from the shaped mandrel.

7. The method of claim 3 further comprising removing the tubular circumferentially corrugated fibrous structure from the shaped mandrel.

8. The method of claim 4 further comprising removing the tubular circumferentially corrugated fibrous structure from the shaped mandrel.

9. The method of claim 1 wherein depositing fibers on a shaped mandrel includes depositing fibers on an inflated, relatively rotating shaped mandrel, the method further comprising deflating the shaped mandrel and removing the porous, circumferentially-corrugated fibrous structure from the deflated mandrel.

10. The method of claim 2 wherein depositing fibers on a shaped mandrel includes depositing fibers on an inflated, relatively rotating shaped mandrel, the method further comprising deflating the shaped mandrel and removing the porous, circumferentially-corrugated fibrous structure from the deflated mandrel.

11. The method of claim 3 wherein depositing fibers on a shaped mandrel includes depositing fibers on an inflated, relatively rotating shaped mandrel, the method further comprising deflating the shaped mandrel and removing the porous, circumferentially-corrugated fibrous structure from the deflated mandrel.

12. The method of claim 4 wherein depositing fibers on a shaped mandrel includes depositing fibers on an inflated, relatively rotating shaped mandrel, the method further comprising deflating the shaped mandrel and removing the porous, circumferentially-corrugated fibrous structure from the deflated mandrel.

13. The method of claim 1 further comprising collapsing the porous circumferentially extending corrugations.

14. The method of claim 2 further comprising collapsing the porous circumferentially extending corrugations.

15. The method of claim 3 further comprising collapsing the porous circumferentially extending corrugations.

16. The method of claim 5 further comprising collapsing the porous circumferentially extending corrugations.

17. The method of claim 13 wherein collapsing the corrugations includes contacting adjacent circumferentially extending webs.

18. The method of claim 14 further comprising collapsing the porous circumferentially extending corrugations.

19. The method of claim 15 further comprising collapsing the porous circumferentially extending corrugations.

20. The method of claim 16 further comprising collapsing the porous circumferentially extending corrugations.

\* \* \* \* \*